Sept. 24, 1968    A. ASHKIN ET AL    3,403,348
FREQUENCY SELECTIVE LASER DEVICES
Filed Sept. 29, 1964    4 Sheets-Sheet 1
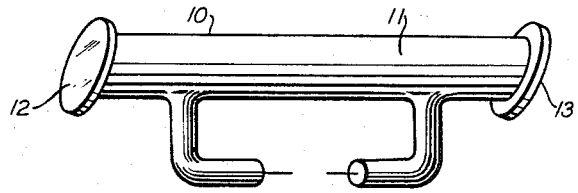
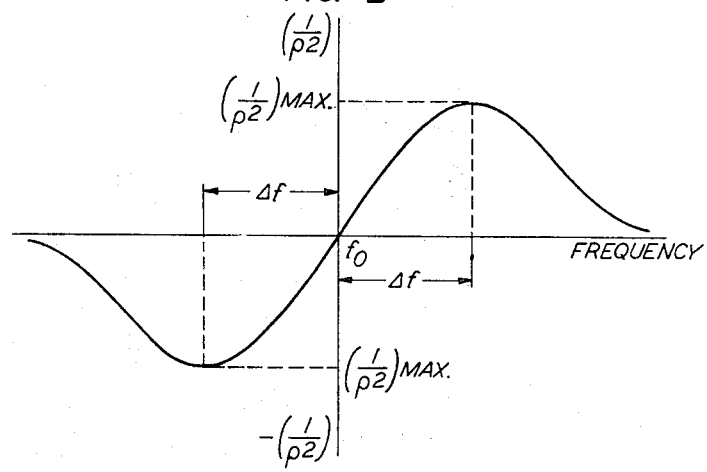
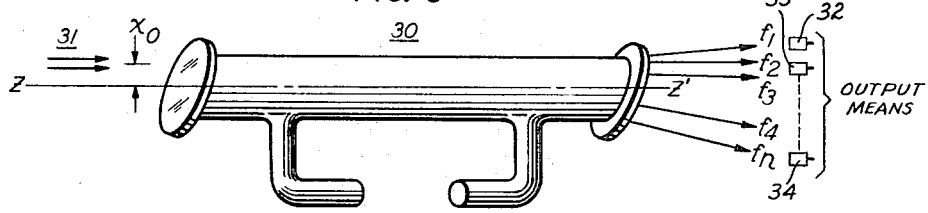
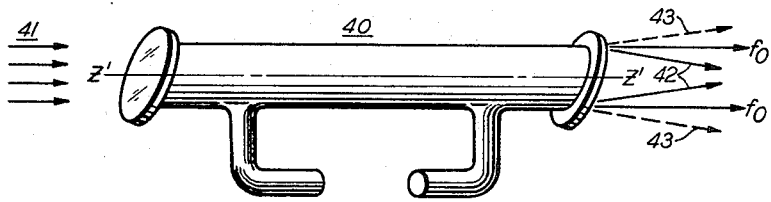
INVENTORS  A. ASHKIN
H. W. KOGELNIK
BY *Sylvan Sherman*
ATTORNEY Sept. 24, 1968    A. ASHKIN ET AL    3,403,348
FREQUENCY SELECTIVE LASER DEVICES
Filed Sept. 29, 1964    4 Sheets-Sheet 4

United States Patent Office 3,403,348
Patented Sept. 24, 1968

3,403,348
FREQUENCY SELECTIVE LASER DEVICES
Arthur Ashkin, Bernardsville, and Herwig W. Kogelnik, Summit, N.J., assignors to Bell Telephone Laboratories, Incorporated, New York, N.Y., a corporation of New York
Filed Sept. 29, 1964, Ser. No. 400,266
3 Claims. (Cl. 330—4.3)

ABSTRACT OF THE DISCLOSURE

Because the index of refraction in a discharge gas column varies as a function of frequency and radius, light rays of different frequencies are defracted different amounts as they traverse the column. By suitably locating the cavity mirrors on opposite sides of the column, a single frequency laser oscillator is realized. By changing the location and orientation of one of the mirrors, the laser can be continuously tuned over the band of frequencies within the Doppler line width.

A discharge gas column is also used as a combination amplifier and focusing element in a wave guidance system, and as a prism to separate the different frequencies in a multifrequency transmission system.

---

This invention relates to gas lasers.

Because the cavity resonator normally used in a laser is typically much larger than the wavelengths of the signals produced therein, it is inherently a multimode device. As a consequence, a laser tends to be capable of simultaneously oscillating at a plurality of frequencies whose nominal spacings are given by $c/2L$, where $c$ is the velocity of light, and $L$ is the effective cavity length. In particular, if gain is available in the system over a frequency band $\Delta F$ larger than $c/2L$, as it generally is in high-gain, large output lasers, then the number of oscillating modes is approximately equal to $\Delta F(c/2L)$. Typically, gain will be available over the Doppler line width of the excited state.

The presence of many modes in the output of a laser intended for use in a communications system is disadvantageous. One of the principal disadvantages is that the frequency spacing $c/2L$ between such modes places a limit upon the band-width over which the laser output can be modulated. There are, in addition, other undesirable complications associated with multimode oscillations such as mode coupling, mode locking and the associated instabilities.

It is, accordingly, an object of this invention to obtain operation of a gas laser essentially at a single frequency.

It is a further object of this invention to continuously tune a gas laser over its Doppler line width.

In accordance with one aspect of the invention, essentially single frequency oscillation in a gas laser is achieved by utilizing the focusing and prism properties of a discharge gas column and particularly selecting the geometry of the cavity resonator to favor one of the frequencies within the laser Doppler line width. Because the refractive index of a lasing column of gas varies both as a function of radius and of frequency, light rays of different frequencies are refracted different amounts as they traverse the column. By suitably shaping, locating and orienting the mirrors defining the laser cavity, oscillations at essentially only one frequency can be obtained to the exclusion of oscillations at other frequencies. By changing the mirror locations and orientations, the laser can be continuously tuned over the band of frequencies within the Doppler line width.

In a first embodiment of this aspect of the invention, the refractive properties of a lasing column of gas are utilized. In this embodiment a pair of planar mirrors, defining the laser cavity, are particularly located and oriented so as to resonate wave energy at one frequency in preference to wave energy at any other frequency within the Doppler line width.

In a second embodiment of this aspect of the invention, the focusing properties of a lasing column of gas are utilized to favor single frequency operation. In this embodiment, the resonant cavity is defined by a pair of convex mirrors whose focal lengths are selected so as to limit the region of low-loss operation to a small band of frequencies that includes essentially only one of the many possible oscillating modes.

In a third embodiment of this aspect of the invention, both the focusing and the refractive properties of a column of gas are combined in a single structure to favor single frequency operation. In this embodiment the mirrors are displaced and oriented as in the first embodiment and, in addition, are convex in shape, as in the second embodiment of the invention.

As is also indicated below, in accordance with other aspects of the invention, a gas discharge column can be used as a combined amplifier and focusing element in a guided optical transmission path, or as a combined amplifier and channel separator in a multi-frequency carrier system.

These and other objects and advantages, the nature of the present invention, and its various features, will appear more fully upon consideration of the various illustrative embodiments now to be described in detail in connection with the accompanying drawings, in which:

FIG. 1 shows a discharge tube of a type typically used in a gas laser;

FIG. 2, given for purposes of explanation, illustrates the manner in which $1/\rho^2$ varies as a function of frequency;

FIG. 3 illustrates the prism effect produced by a discharge tube;

FIG. 4 illustrates the focusing properties of a discharge tube;

Figure 5:
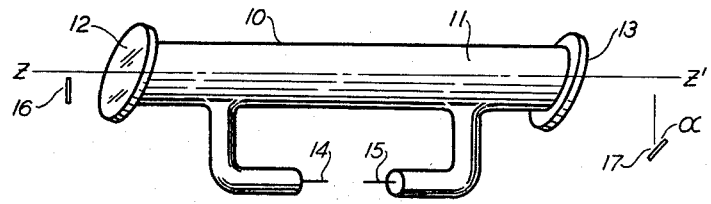
FIG. 5 illustrates a first embodiment of the invention using planar mirrors.
Figure 6:
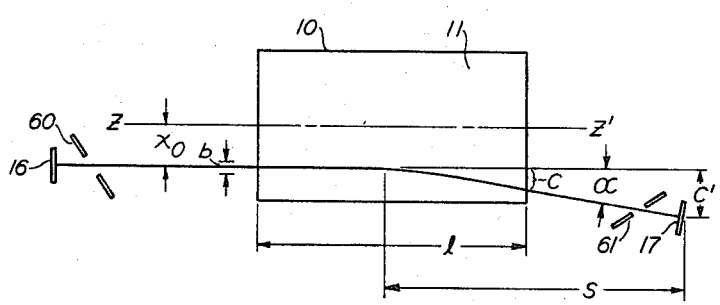
Figure 7:
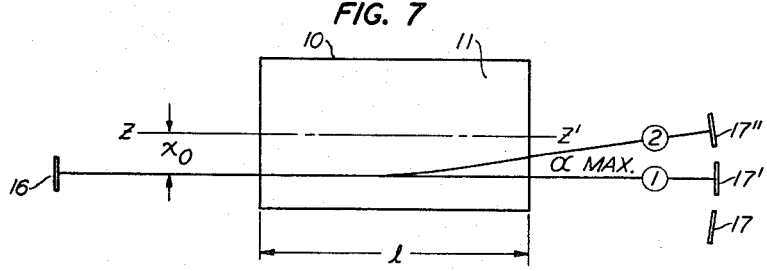
Figure 8:
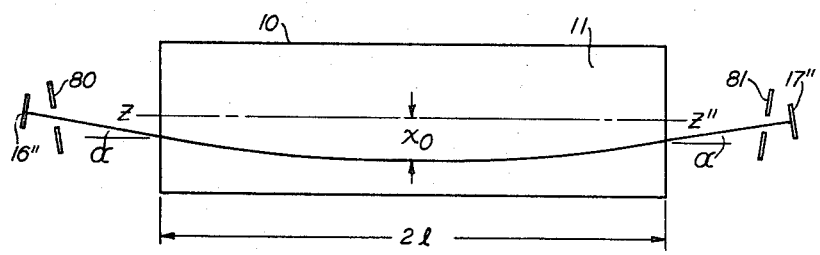
Figure 9:
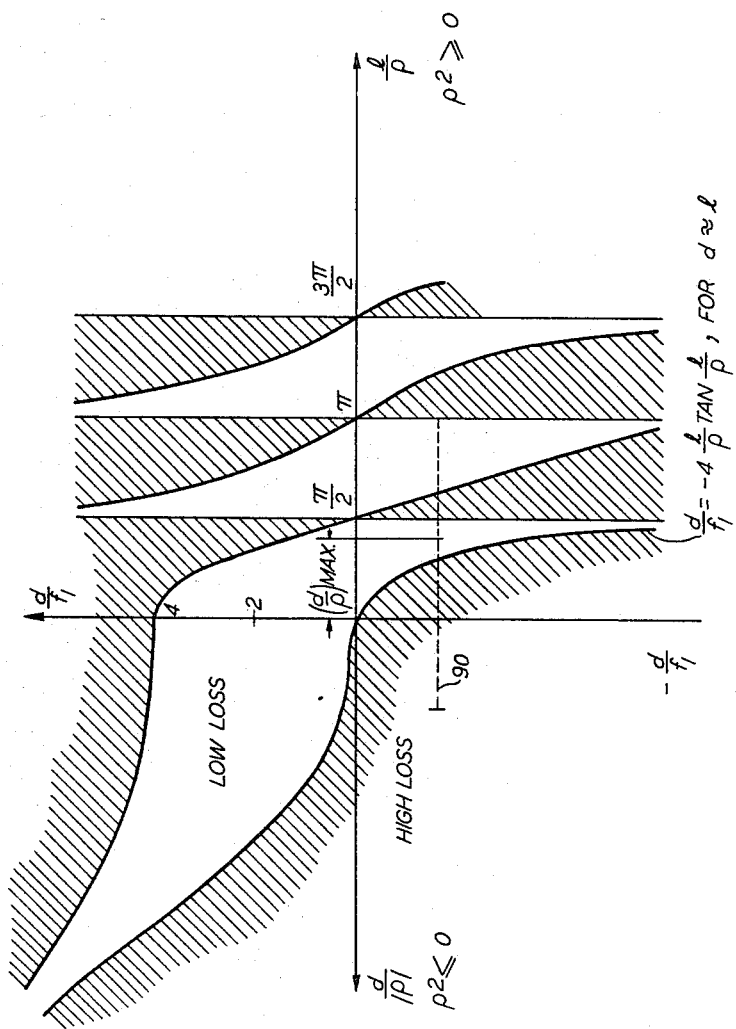
Figure 10:
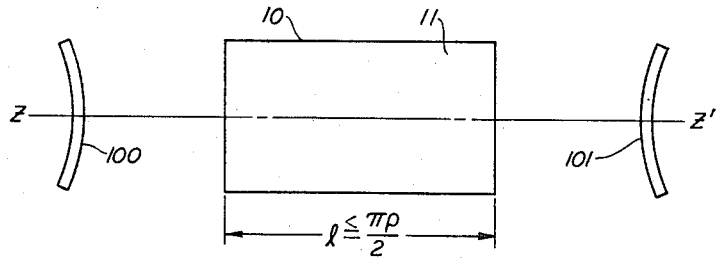
Figure 11:
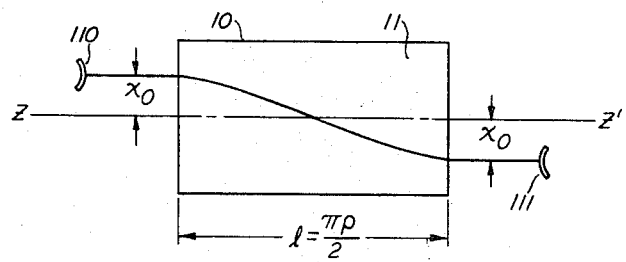
Figure 12:
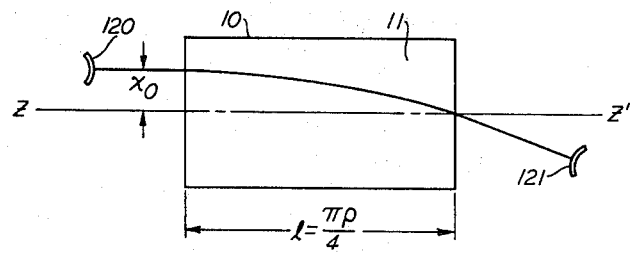

FIGS. 6 and 7, included for purposes of explanation, illustrate the manner in which the prism properties of a discharge tube can be utilized to produce single frequency operation;

FIG. 8 is a modification of the embodiment of FIG. 5;

FIG. 9 is a stability diagram of a laser;

FIG. 10 is a second embodiment of the invention utilizing convex mirrors;

FIG. 11 is a third embodiment of the invention utilizing convex mirrors offset from the tube axis;

FIG. 12 is an alternate arrangement of the embodiment of FIG. 11; and

Figure 13:
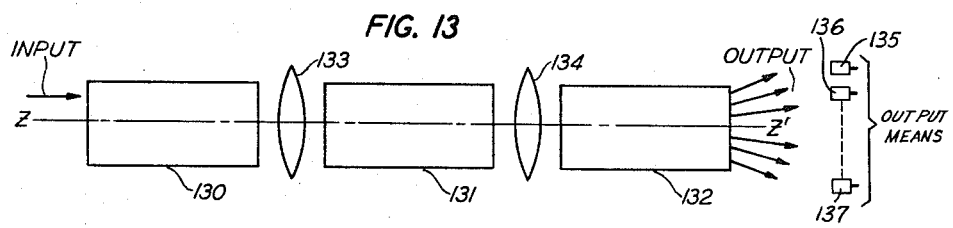

FIG. 13 shows the use of a plurality of separate gas column to produce enhanced effects.

Referring to the drawings, FIG. 1 shows a discharge tube of a type typically used in a gas laser, comprising an enclosed, elongated tube 10 within which there is a gaseous active medium 11. To minimize reflections, the ends 12 and 13 of tube 10 are inclined at the Brewster angle. A gas discharge is produced and maintained in tube 10 by means of a D.C. power supply (not shown). It is to be understood, however, that insofar as it relates to the present invention, the gas discharge can be produced by any other means well known in the art, such as by the application of radio frequency fields.

The effect of the gas discharge thus produced is to produce a population inversion in the energy level system of medium 11. If exposed to electromagnetic radiation of a frequency related to the energy level system of the medium, the device will function as a laser amplifier. If placed within a suitable resonant cavity, stimulated emission of radiation will result and the device will oscillate or "lase." These properties of a gas discharge column are well known and are described, for example, in an article by A. Yariv and J. P. Gordon entitled "The Laser," published in the January 1963 issue of the Proceedings of the Institute of Radio Engineers.

Because the gain is not uniform across the cross section of the gas column, the refractive index of the gas column also varies. In particular, the refractive index of the medium varies as a function of the distance $r$ from the tube axis, and as a function of frequency.

For the purposes of explanation, and in order to obtain a qualitative insight into the lens-like properties of the medium, this variation in refractive index can be assumed to be related to the radius and frequency in the following manner;

$$n(r) = 1 - 2\left(\frac{r^2}{\rho^2}\right) \quad (1)$$

where the parameter $(1/\rho^2)$ measures the degree of variation as a function of frequency.

It is to be understood, however, that while the variation in refractive index for any particular column of gas may differ from the precise expression given by Equation 1, it will, nevertheless, exhibit comparable properties since it is the variations in gain within the medium that produce the variations in refractive index upon which the present invention is based.

As can be seen from Equation 1, the refractive index is a maximum along the axis ($r=0$), and decreases with increasing distance from the axis for positive values of $(1/\rho^2)$. For negative values of $(1/\rho^2)$, the refractive index is a minimum along the axis, and increases with increasing distance from the axis.

The parameter $(1/\rho^2)$, however, varies with frequency. FIG. 2, given for purposes of explanation, illustrates the manner in which $(1/\rho^2)$ varies as a function of frequency for a typical laser line.

At the center frequency $f_0$ of the line, $1/\rho^2 = 0$. At the two frequencies which are shifted from $f_0$ by an amount $\Delta f$ (half the Doppler width of the line), the maximum values $(1/\rho^2)_{max.}$ are obtained. The amplitude of $(1/\rho^2)_{max.}$ is given as a function of the gain $g_0$ along the tube axis at frequency $f_0$, and the tube radius $r_0$, as $$\left(\frac{1}{\rho^2}\right)_{max.} = \frac{\lambda g_0}{16\pi^2 r_0^2} \quad (2)$$

where $\lambda$ is the wavelength.

For frequencies larger than $f_0$, $(1/\rho^2)$ is positive and the medium is "focusing." Below $f_0$, $(1/\rho^2)$ is negative and the medium is "defocusing" in its action. Thus, it is apparent that in certain respects a lasing column of gas is the equivalent of a lens whose focusing properties vary as a function of frequency. It is also apparent from a consideration of these properties, that a discharge tube can be used as frequency-selective prism. These effects are illustrated in FIGS. 3 and 4.

In FIG. 3, a gas discharge tube 30 is shown exposed to electromagnetic radiation 31 which includes frequency components $f_1, f_2, f_3, f_4 \ldots f_n$ within the band $f_0 \pm \Delta f$. As indicated above, the refractive index is a maximum along the tube axis. However, the rate of change in the refractive index, upon which the operation of this embodiment of the present invention is based, is a minimum in this location. Accordingly, the input signal is advantageously applied to the gas column at a point displaced an amount $x_0$ from the column axis. The distance $x_0$ is as large as possible, consistent with the beam size which, as is discussed below, is advantageously no greater than about ¼ to ⅓ the column radius.

Because of the variation in the refractive index of the gas column, the various components injected into the discharge tube at a distance $x_0$ from the tube axis Z–Z', are deflected different amounts, depending upon their frequency. Thus, at the output end of the discharge tube, each of the frequency components $f_1 \ldots f_n$, leaves the tube along a unique direction which is a function of frequency and can therefore, be coupled to a plurality of separate output means 32, 33 . . . 34, each located a different distance from the longitudinal axis Z–Z' of discharge tube 30. The tube, therefore, has the property of a high resolution prism and can, therefore, be used as a combined amplifier and channel separator in a multifrequency transmission system in accordance with one aspect of the invention.

FIG. 4 illustrates the focusing property of a discharge tube. In this illustration, wave energy 41 at a single frequency is injected into a discharge tube 40. In this embodiment of the invention, the beam can be as large as the tube and have its center along the tube axis Z–Z'. If the applied wave energy is at frequency $f_0$, at the center of the Doppler band, it experiences no focusing effect and passes through the tube as indicated by the arrows marked $f_0$. If the frequency of the injected wave energy is higher than $f_0$, the tube has a focusing effect upon the wave energy as indicated by the arrows 42. On the other hand, at frequencies below $f_0$, the tube has a defocusing effect as illustrated by arrows 43. A gas discharge column can thus be used as a combined amplifier and focusing element in an optical transmission system in accordance with another aspect of the invention.

In accordance with still another aspect of the present invention, both the prism and focusing properties of a gas discharge tube are utilized as a means for producing essentially single frequency lasers.

FIG. 5 is a first embodiment of the invention comprising the gas discharge tube of FIG. 1 located within an optical cavity defined by the planar mirrors 16 and 17, at least one of which is partially transmissive, so that wave energy can be coupled out of the cavity through the mirror.

It will be noted that mirrors 16 and 17, unlike the mirrors used in prior art lasers, are shown to be much smaller in cross-sectional area than the tube 10 and are located with their centers displaced from the tube axis Z–Z'. (The effective size of the mirrors will be considered in greater detail hereinbelow.) In addition, the surfaces of mirrors 16 and 17 are not parallel to each other as in the usual laser. As shown, the surface of mirror 16 is perpendicular to the axis Z–Z', while the surface of mirror 16 is tilted through an angle $\alpha$ with respect to mirror 16. The reasons for these differences are explained in connection with FIG. 6, which shows the essentials of the embodiment of FIG. 5 including the discharge tube 10 and the mirrors 16 and 17.

Given that the index of refraction varies in the manner described by Equation 1, it can be shown that for a discharge tube of length $l$, much smaller than $\rho$, the action of the gas medium is equivalent to that of a thin lens of focal length $$f = \frac{\rho^2}{4l} \quad (3)$$

located at the tube center. From this it follows that a light ray entering the medium along a path parallel to the tube axis Z–Z' and displaced a distance $x_0$ therefrom, is deflected a distance $c$ and emerges deviated by an angle $\alpha$, where $$\alpha = \frac{x_o}{f} = 4\frac{x_o l}{\rho^2} \tag{4}$$

and $$c = \tfrac{1}{2}\alpha l \tag{5}$$

If the center of mirror 17 is located a distance S from the tube center, the total deviation at mirror 17 is $$c' = \alpha S \tag{6}$$

Thus, for each value of $\rho$, corresponding to a particular frequency, there is a unique path that is followed by a ray at that frequency. At any other frequency, within the range $f_o \pm \Delta f$, the paths differ. Thus, in the illustration given in FIG. 6, the mirrors 16 and 17 (where mirror 17 is tilted by the angle given by Equation 4, so that it is perpendicular to the incident ray, and displaced from the axis an amount given by Equation 6, define an optical cavity favorable to the support of wave energy at essentially only a particular frequency.

From Equation 4 it is seen that the angular deviation, $\alpha$, produced by the gas column varies as a function of the distance $x_o$ from the tube axis Z–Z'. Thus, the distance of the incident beam from the axis is advantageously made large. However, as the distance from the axis is increased, the beam size $b$ must be correspondingly decreased in order for the beam to fit and remain within the confines of the gas column. The beam size is also limited by the fact that the index of refraction, at any particular frequency, varies across the beam. Thus, a ray on one side of the beam is deflected a different amount than a ray at the same frequency on the other side of the beam. These various limitations upon the beam size are comprised, in practice, by making the beam no greater than about ¼ to ⅓ the radius of the gas column. The cross-sectional areas of the mirrors and their curvatures are then determined, for the selected beam size, in the manner well known in the art. Neglecting diffraction effects, the cross-sectional area of each mirror is approximately equal to the cross-sectional area of the beam. In high gain lasers, where greater loss can be tolerated, the mirrors are advantageously made smaller than the beam size for improved frequency discrimination.

Because it is desired that wave energy at only one particular frequency be confined within the cavity defined by the mirrors, the mirrors are preferably located so as to intercept and reflect wave energy at this one frequency to a greater extent than wave energy at all other frequencies capable of being emitted by the lasing gas column. In view of the fact that the direction of propagation of wave energy leaving the gas column is different for different frequencies, some additional frequency discrimination can be realized by locating the mirrors at a distance from the gas column. However, the diffraction of the beam ultimately limits the usefulness of this technique as it requires larger mirrors in order to intercept a corresponding amount of wave energy at the desired frequency which, in turn, makes it possible for the mirrors to intercept wave energy at other frequencies equally well. Thus, while increasing the distance between a mirror and the gas column may require an increase in the physical size of the mirror to compensate for the effects of diffraction, the "effective" size of each mirror, that is, the preferable size for favoring oscillations at essentially one frequency in accordance with the invention (and avoiding diffraction effects), is as given above.

Notwithstanding these considerations, the exact size of each of the mirrors is not critical. If they are large, they may intercept rays at other frequencies. However, because the rays for each frequency follow a unique path, rays at frequencies other than at the preferred frequency are reflected out of the cavity (i.e., the cavity is lossy) and oscillations at these remote frequencies do not tend to build up.

In practice the size of the mirrors is controlled by means of adjustable apertures located within the cavity between the mirrors and the active medium as illustrated in FIG. 6, wherein two adjustable apertures 60 and 61 are interposed between the mirrors 16 and 17, respectively, and the active medium 11. Preferably, the apertures are slanted to minimize spurious reflections. If required, the resolution can be further enhanced by the use of focusing lenses (not shown) inserted between the apertures and the mirrors.

As the location and orientation of mirror 17 is changed, the frequency of oscillations favored by the cavity is correspondingly changed. For example, in FIG. 7, a mirror 17' is located along the direction of ray 1 for which $\alpha=0$. From Equation 4, $\alpha=0$ when $1/\rho^2=0$. From FIG. 2, it is seen that $1/\rho=0$ at frequency $f_o$. Thus, only rays at frequency $f_o$ follow this path and the laser will oscillate at frequency $f_o$.

Also illustrated in FIG. 7 is a second mirror 17", located so as to intercept rays emerging at angle $\alpha_{max}$, corresponding to $(1/\rho^2)_{max}$. The cavity defined by mirror 16–17" will, accordingly, support wave energy at frequency $f_o + \Delta f$.

It follows from the above discussion that by making mirror 17 adjustable in location and orientation, a continuously tunable laser can be obtained which is tunable over the Doppler line width. Alternatively, the laser can be tuned, using a fixed pair of mirrors, by varying the gain of the laser. From Equation 2 it is seen that the refractive index varies as a function of gain. Thus, the amount of deflection produced at any given frequency is also a function of the gain. It therefore follows that if the gain is changed, either by varying the excitation or pump applied to the gas column, or by the insertion of loss within the cavity, the laser can be made to oscillate at different frequencies.

By increasing the length of the gas column, the arrangement shown in FIG. 8 is obtained. In this embodiment the length of the column is doubled and the mirrors 16" and 17" are both tilted so that their surfaces are perpendicular to rays emerging from tube 10, that is, at an angle $\alpha$ to the tube axis Z–Z'. So tilted, the surfaces of the mirrors are oriented to favor low-loss propagation at the frequency of the particular ray depicted in the figure.

In the discussion so far, we have considered the situation where $l$ is small compared to $\rho$. In the discussion to follow, we will consider the case of a long lasing gas column for which $l$ is comparable to, or larger than $\rho$. In this latter case, it can be shown that the medium behaves as a thick lens of focal length $$f = \frac{\rho}{2 \sin 2\frac{l}{\rho}} \text{ for } \rho^2 \geq 0 \tag{7}$$

and $$f = -\frac{|\rho|}{2 \sinh 2\frac{l}{|\rho|}} \text{ for } \rho^2 \leq 0 \tag{8}$$

The location of the principal planes of this thick lens is given in terms of the distance $s$ from the column ends as $$s = \frac{\rho}{2} \tan \frac{l}{\rho} \text{ for } \rho^2 \geq 0 \tag{9}$$

and $$s = \frac{|\rho|}{2} \tanh \frac{l}{|\rho|} \text{ for } \rho^2 \leq 0 \tag{10}$$

(It will be noted that Equation 3 can be derived from Equation 7 simply by making $$\frac{l}{|\rho|}$$

small compared to unity.)

As before, the properties of a lasing gas medium can be utilized to design a single frequency laser. To select the appropriate parameters for the system, reference is had to the stability diagram shown in FIG. 9 which takes into account the focusing properties of the gas column as characterized by the parameter $\rho$. The vertical axis of the diagram is the ratio $d/f_1$, where $d$ is the cavity length, and $f_1$ the focal length of the mirrors. The horizontal axis is the ratio $$\frac{l}{|\rho|}$$

where $l$ is the length of the gas column, and $\rho$ is the frequency dependent parameter given by Equation 2. Each point in this diagram represents a resonator of specified dimensions and refractive characteristics. Systems represented by points in the shaded regions have very high diffraction losses. Systems represented by points in the unshaded regions have very low diffraction losses. Near the boundaries between these two regions, there is a sharp change of loss value.

For the center frequency, $f_0$, of the laser line of interest, $1/|\rho|=0$, and the properties of the cavity are represented by points on the $d/f_1$ axis. As is well known, there is a low-loss region between $d/f_1=0$ (plane parallel resonator) and $d/f_1=4$ (spherical resonator) which includes therebetween the confocal resonator.

For frequencies other than $f_0$, the value of $l/|\rho|\neq 0$, and reaches a maximum $$\left(\frac{d}{|\rho|}\right)_{\max.}$$

at frequencies $f_0 \pm \Delta f$ as explained in connection with FIG. 2.

A resonator with a given mirror spacing $d$ and focal length $f_1$ is represented by the various points on a line parallel to the horizontal axis, as shown by the dashed line 90 in FIG. 9. It will be noted that if the mirrors have negative focal lengths (are convex), there is only a small band of frequencies for which the diffraction losses are small. This frequency band becomes narrower and narrower, as the ratio $d/f_1$ becomes larger. Laser oscillations are thus favored in this restricted band. If this band includes only one of the possible longitudinal cavity modes, single frequency oscillation is obtained. Thus, in accordance with a second embodiment of the invention, single frequency operation is obtained by using two spherical convex mirrors whose centers lie along axis Z–Z', as illustrated in FIG. 10. In this second embodiment, the active medium 11 is contained within an enclosure 10 of length $l$ as before. However, in this embodiment the cavity is defined by the two spherical convex mirrors 100 and 101, symmetrically disposed about the longitudinal axis Z–Z' of the gas column. One of the mirrors is partially transparent to couple wave energy out of the cavity in the manner well known in the art. The length $l$ is preferably no greater than $\pi\rho/2$ to avoid the possibility of oscillations at a frequency within the next low-loss region between $\pi/2$ and $\pi$ shown in FIG. 9.

In the embodiment of the invention illustrated in FIG. 5, the deflection properties of a lasing column of gas are utilized to favor single frequency operation. In the embodiment illustrated in FIG. 10, the focusing properties of such a column of gas are utilized to favor single frequency operation. These two effects can be combined in a single device to obtain the combined advantages of both, and thereby increase the tendency of single frequency operation.

If, as an example, we consider a ray introduced into a long lasing column in a direction parallel to the tube axis and displaced a distance $x_0$ therefrom, we find that it follows a cosine path given by $$x = x_0 \cos \frac{2l}{\rho} \quad (11)$$

Thus, if we select the length $l$ such that $l/\rho = \pi/2$, two small spherical convex mirrors, whose centers are displaced by an amount $x_0$ on opposite sides of the longitudinal axis, will define a cavity at the frequency for which $\rho$ is as given above. Such an arrangement, shown in FIG. 11, includes the active medium 11 within enclosure 10 and the convex mirrors 110 and 111 displaced a distance $x_0$ from the axis Z–Z'. For $l=\pi/2$, a ray entering the active medium parallel to axis Z–Z' at one end, describes a half cycle of a cosine curve, and leaves the active medium in a direction parallel to axis Z–Z' and displaced an equal distance $x_0$ on the other side of the axis.

Other arrangements are possible, depending upon the length $l$ selected. For example, if $l=\pi\rho/4$, the arrangement shown in FIG. 12 is obtained. In this embodiment, a ray entering the gas column in a direction parallel to axis Z–Z', and displaced a distance $x_0$ therefrom, traverses a path equivalent to a quarter of a cosine curve and leaves the active medium at a 45 degree angle at the other end.

In the embodiments of FIGS. 11 and 12, not only are the mirrors located along a unique light path so as to resonate light of the appropriate frequency, but the mirror curvatures are selected from the stability diagram of FIG. 9 to enhance the discrimination against all other frequencies by increasing their diffraction losses.

The various embodiments described hereinabove use a single gas column. However, it may be desirable in some situations to produce greater beam deflection and separation. This can be done by increasing the gain of the laser or, alternatively, by cascading a plurality of separate gas columns of fixed gain, as illustrated in FIG. 13. In this embodiment three gas columns 130, 131, and 132 are used with focusing lenses 133 and 134 between adjacent columns. The result is to increase the effective length of the device and, consequently, to increase the separation between adjacent frequencies at the output end of the device. Each of the output signals, represented by an arrow at the output end of column 132, is then coupled to a different one of a plurality of output means 135, 136 . . . 137.

Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A lasser amplifier and channel separator comprising:
   an elongated gas discharge column;
   means for applying electromagnetic wave energy over a band of frequencies within the Doppler line width of said laser to one end of said column;
   and a plurality of output means located at the other end of said column for receiving said wave energy;
   each of said output means being located at a different distance from the longitudinal axis of said column.

2. In an optical transmission path having focusing elements of given focal length longitudinally spaced therealong, a combined amplifier and focusing element comprising:
   an alongated gas discharge column disposed within said path;
   said column having an equivalent focal length equal to that of said focusing elements.

3. A laser amplifier and channel separator comprising in cascade:
   a plurality of elongated gas discharge columns;
   focusing means disposed between adjacent columns;
   means for applying electromagnetic wave energy over a band of frequencies within the Doppler line width of said amplifier to an input end of the first of said columns;

and a plurality of output means located at the output end of the last of said columns for receiving said wave energy;

each of said output means being located at a different distance from the longitudinal axis of said column.

References Cited

"Bell Laboratories Record," September 1964, pp. 294–295.

Berreman: "Bell System Technical Journal," July 1964, pp. 1469–1475.

ROY LAKE, *Primary Examiner.*

D. R. HOSTETTER, *Assistant Examiner.*